US012356531B2

(12) United States Patent
Kamihara et al.

(10) Patent No.: US 12,356,531 B2
(45) Date of Patent: Jul. 8, 2025

(54) HEATING DEVICE

(71) Applicants: MITSUBISHI HEAVY INDUSTRIES, LTD., Tokyo (JP); Akita University, Akita (JP)

(72) Inventors: Nobuyuki Kamihara, Tokyo (JP); Naomoto Ishikawa, Tokyo (JP); Kiyoka Takagi, Tokyo (JP); Sota Kamo, Tokyo (JP); Mikio Muraoka, Akita (JP); Yukihiro Yoshida, Akita (JP)

(73) Assignees: MITSUBISHI HEAVY INDUSTRIES, LTD., Tokyo (JP); AKITA UNIVERSITY, Akita (JP)

( * ) Notice: Subject to any disclaimer, the term of this patent is extended or adjusted under 35 U.S.C. 154(b) by 860 days.

(21) Appl. No.: 17/616,453

(22) PCT Filed: May 25, 2020

(86) PCT No.: PCT/JP2020/020463

§ 371 (c)(1),
(2) Date: Dec. 3, 2021

(87) PCT Pub. No.: WO2020/246284

PCT Pub. Date: Dec. 10, 2020

(65) Prior Publication Data

US 2022/0330392 A1 Oct. 13, 2022

(30) Foreign Application Priority Data

Jun. 4, 2019 (JP) ................................ 2019-104772

(51) Int. Cl.
*H05B 6/44* (2006.01)
*H05B 6/40* (2006.01)

(52) U.S. Cl.
CPC ................ *H05B 6/40* (2013.01); *H05B 6/44* (2013.01)

(58) Field of Classification Search
CPC .... H05B 6/40; H05B 6/44; H05B 6/36; Y02P 10/25
See application file for complete search history.

(56) References Cited

U.S. PATENT DOCUMENTS 5,591,370 A * 1/1997 Matsen ................. H05B 6/365 264/510
2008/0264932 A1 10/2008 Hirota

FOREIGN PATENT DOCUMENTS

JP 2009-129695 6/2009
JP 2009129695 A * 6/2009

(Continued)

OTHER PUBLICATIONS

International Search Report issued Aug. 11, 2020 in corresponding International (PCT) Patent Application No. PCT/JP2020/020463.

(Continued)

*Primary Examiner* — Tiffany T Tran
(74) *Attorney, Agent, or Firm* — Wenderoth, Lind & Ponack, L.L.P.

(57) ABSTRACT

A heating device includes a magnetic field heating coil that inductively heats a composite material by a magnetic field. The composite material has a length in a depth direction and a length in a width direction orthogonal to the depth direction. The magnetic field heating coil has a first coil part provided along the width direction, and a pair of second coil parts provided on both sides of the first coil part in the width direction so as to be continuous with the first coil part, the second coil parts being tilted a predetermined angle θ to one side in the depth direction with respect to the width direction. The first coil part and the second coil parts are (Continued)

symmetric with respect to a line segment drawn in the depth direction at a center of the first coil part in the width direction.

5 Claims, 9 Drawing Sheets

(56) References Cited

FOREIGN PATENT DOCUMENTS

| | | | |
|---|---|---|---|
| JP | 2014-116293 | | 6/2014 |
| JP | 2015-52467 | | 3/2015 |
| JP | 2016-58168 | | 4/2016 |
| JP | 2016058168 A | * | 4/2016 |

OTHER PUBLICATIONS

Written Opinion issued Aug. 11, 2020 in corresponding International (PCT) Patent Application No. PCT/JP2020/020463.

* cited by examiner

HEATING DEVICE

FIELD

The present invention relates to a heating device including a magnetic field heating coil that inductively heats a composite material by a magnetic field.

BACKGROUND

Electromagnetic induction heating devices in each of which a coil conductor is installed inside a coil support member have conventionally been known as heating devices (see Patent Literature 1, for example). The coil conductor is placed substantially concentrically on a heating surface of the coil support member.

CITATION LIST

Patent Literature

Patent Literature 1: Japanese Patent Application Laid-open No. 2014-116293

SUMMARY

Technical Problem

Placing a coil conductor as in Patent Literature 1, however, causes a composite material to be heated unevenly. For this reason, when a composite material is heated and molded by using a heating device, the composite material may be molded imperfectly.

It is, therefore, an object of the present invention to provide a heating device capable of ensuring uniform heating of a composite material.

Solution to Problem

A heating device according to the present invention includes a magnetic field heating coil that inductively heats a composite material by a magnetic field. The composite material has a length in a depth direction and a length in a width direction orthogonal to the depth direction. The magnetic field heating coil has a first coil part provided along the width direction, and a pair of second coil parts provided on both sides of the first coil part in the width direction so as to be continuous with the first coil part, the second coil parts being tilted a predetermined angle to one side in the depth direction with respect to the width direction. The first coil part and the second coil parts are symmetric with respect to a line segment drawn in the depth direction at a center of the first coil part in the width direction.

According to this structure, the magnetic field heating coil having the first coil part and second coil parts enables the composite material to be uniformly heated.

Further, it is preferable that the magnetic field heating coil further includes a pair of third coil parts provided in such a manner that the third coil parts and the second coil parts are symmetric with respect to a line segment drawn in the width direction on the first coil part.

According to this structure, the magnetic field heating coil having the first coil part, the second coil parts, and the third coil parts enables the composite material in a wider range to be uniformly heated.

Further, it is preferable that a heating target of the magnetic field heating coil is a preset heated area of the composite material, the heated area has a length L in a depth direction, and a length D in a width direction orthogonal to the depth direction, in the magnetic field heating coil, the second coil parts are tilted a predetermined angle to the heated area side with respect to the width direction, the predetermined angle satisfies $0° < \theta \leq 90°$, where θ is the predetermined angle, the first coil part has a length l1 in the width direction, and the length l1 of the first coil part is greater than the length D of the heated area: l1>D.

According to this structure, the magnetic field heating coil can have a shape appropriate for the heated area, which can ensure uniform heating in the heated area.

Further, it is preferable that the magnetic field heating coil is each of a plurality of magnetic field heating coils provided by being lined up in the depth direction.

According to this structure, the magnetic field heating coils can be placed in the depth direction, which can further improve uniform heating of the composite material in the depth direction.

Further, it is preferable that the heating device further includes a connecting part that connects, to each other, the plurality of magnetic field heating coils provided by being lined up in the depth direction.

According to this structure, the connecting part connects the magnetic field heating coils, thereby the magnetic field heating coils can have a shape of the parts being connected in a line, that is, a shape drawn with a single stroke. Thus, the magnetic field heating coils can have a shape easily formed with a single conductor.

Further, it is preferable that the connecting part establishes a connection so that an electric current flowing through one of the magnetic field heating coils adjacent to the depth direction and an electric current flowing through the other magnetic field heating coil adjacent to the depth direction are of opposite phase.

According to this structure, because the magnetic field formed in the magnetic field heating coil on the one side and the magnetic field formed in the magnetic field heating coil on the other side are of opposite polarity, the magnetic fields can be prevented from being canceled out, which enables preferable heating by the magnetic field heating coils.

DESCRIPTION OF EMBODIMENTS

Embodiments according to the present invention will be described in detail below with reference to the drawings. The embodiments are not intended to limit the invention. Components in the embodiments described below include those that are easy and can be replaced by a person skilled in the art, or those that are substantially the same. Furthermore, the components described below may be combined as appropriate, and, if there are a plurality of embodiments, the embodiments may also be combined.

First Embodiment

A heating device 10 according to a first embodiment is a device to be provided in a molding apparatus that molds a composite material 20 by heating and curing reinforced fiber that has been impregnated with resin. The composite material 20 will be described prior to a description of the heating device 10.

To mold the composite material 20, a plurality of reinforced fiber substrates that have been impregnated with resin are laminated in a laminating direction to form a flat laminated body, the laminated body before being cured is placed in the heating device 10, and the laminated body is heated with the heating device 10. In the following description, the laminated body is sometimes referred simply to as the composite material.

The reinforced fiber included in the laminated body has electrical conductivity. Providing the laminated body with a magnetic field in the heating device 10 causes an eddy current to be produced in the interior of the laminated body. The laminated body, when the eddy current has been produced in its interior, generates heat due to the electrical resistance of the reinforced fiber. The heat generated in the reinforced fiber is conveyed to the resin included in the laminated body. The resin is, for example, a thermosetting resin. That is, the laminated body is a composite material that generates heat by being provided with a magnetic field. For the reinforced fiber included in the composite material 20, carbon fiber is illustrated by example in the first embodiment, but the reinforced fiber is not limited thereto and may be other reinforced fiber. For the thermosetting resin included in the composite material 20, a resin having an epoxy resin is illustrated by example in the first embodiment.

Figure 1:
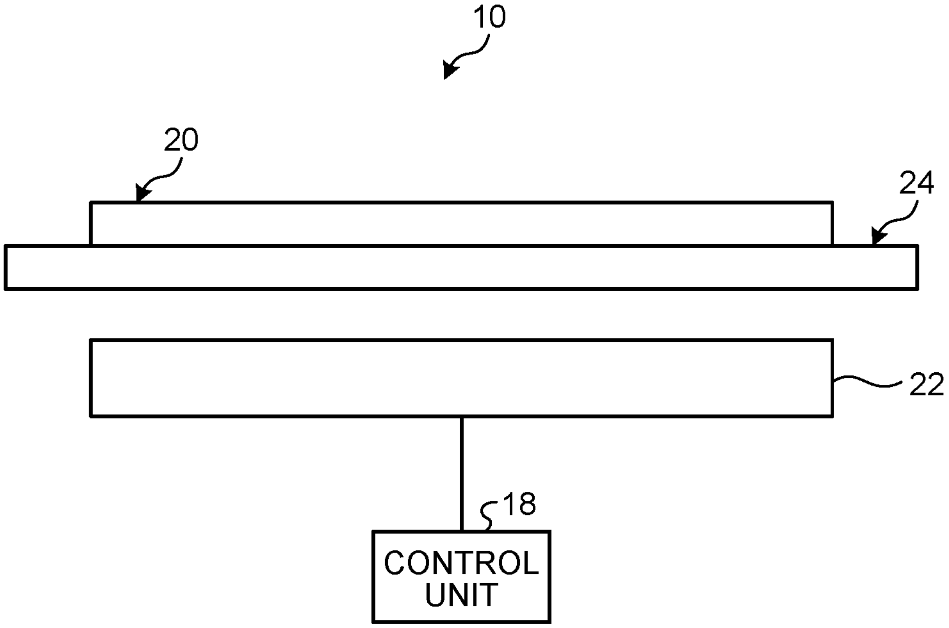
FIG. 1 is a schematic block diagram of a heating device according to a first embodiment.

The heating device 10 will be described next with reference to FIG. 1. FIG. 1 is a schematic block diagram of the heating device according to the first embodiment. The heating device 10 is made up of a mold 24 on which the laminated body is placed, a magnetic field heating coil 22 that applies heat by providing the laminated body with a magnetic field, and a control unit 18 that controls the magnetic field heating coil 22.

The laminated body before being cured is placed on the top face of the mold 24. The mold 24 is made of a transparent material to a magnetic field. That is, the mold 24 is made of a material that stays unchanging to a magnetic field and that produces no eddy current resulting from a magnetic field.

The magnetic field heating coil 22 is disposed on the opposite side of the laminated body across the mold 24 and is disposed so as to face the laminated body with the mold 24 interposed therebetween. A conductor capable of generating a magnetic field is used for the magnetic field heating coil 22, and the magnetic field heating coil 22 provides the laminated body with a magnetic field, thereby heating a predetermined heated area E of the laminated body.

Figure 2:
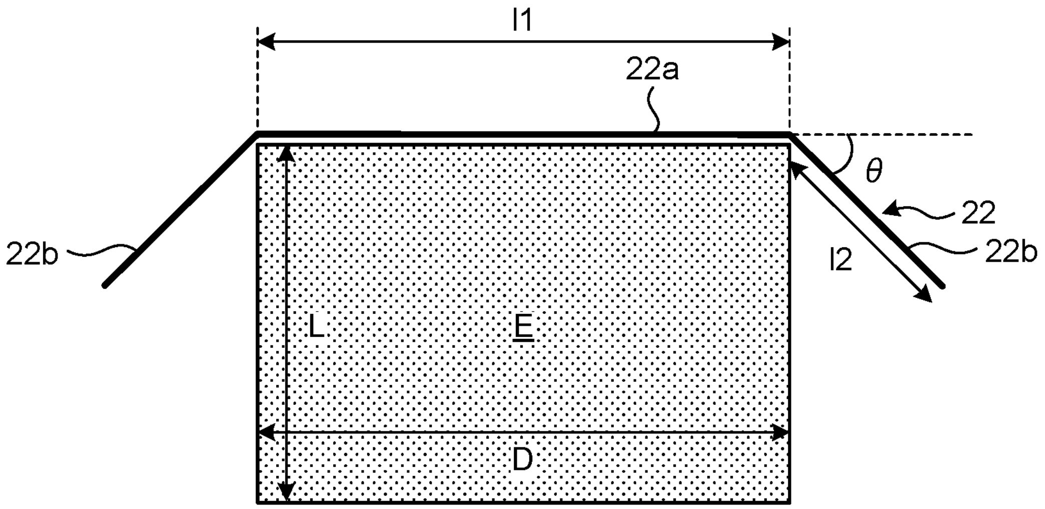
FIG. 2 is a descriptive view illustrating an example of a heated area and a magnetic field heating coil of the heating device according to the first embodiment.

An example of the heated area E and the magnetic field heating coil 22 will be described now with reference to FIG. 2. FIG. 2 is a descriptive view illustrating the example of the heated area and the magnetic field heating coil of the heating device according to the first embodiment. Herein, the heated area E of the laminated body is an area preset to be heated in the laminated body. Thus, the magnetic field heating coil 22 heats at least the heated area E. When the heated area E is heated, the outside of the heated area E is also heated, so the magnetic field heating coil 22 heats an area including the heated area E. The heated area E of the laminated body is square in a plane viewed from the height direction orthogonal to the depth direction and the width direction. In the heated area E of the laminated body, the length in the depth direction (the up-and-down direction in FIG. 2) is L, and the length in the width direction (the right-and-left in FIG. 2) orthogonal to the depth direction is D. With respect to such a heated area E, in order to ensure uniform heating in the heated area E, the magnetic field heating coil 22 in FIG. 2 has a first coil part **22*a* and a pair of second coil parts 22*b***.

The first coil part **22*a* is a part provided linearly along the width direction and is located on one side of the heated area E in the depth direction. Assume that the length of the first coil part 22*a* in the width direction is l1. The length l1 of the first coil part 22*a*** is "$l1>D$", which is greater than the length D of the heated area E in the depth direction.

The second coil parts **22*b* are each provided on either side of the first coil part 22*a* in the width direction so as to be continuous with the first coil part 22*a*. The second coil parts 22*b* are placed so as to be tilted a predetermined angle θ to the heated area E side with respect to the line segment in the width direction. Herein, the predetermined angle θ is "$0° < \theta \leq 90°$". The predetermined angle θ is preferably "$30° < \theta \leq 60°$", and is "$\theta = 45°$", for example, in the first embodiment. Assume that the length of the second coil parts 22*b* is l2. The length l2 of the second coil parts 22*b* is shorter than the length l1 of the first coil part 22*a***.

The first coil part **22*a* and the second coil parts 22*b* are symmetric with respect to the line segment drawn in the depth direction at the center of the first coil part 22*a*** in the width direction.

Figure 3:
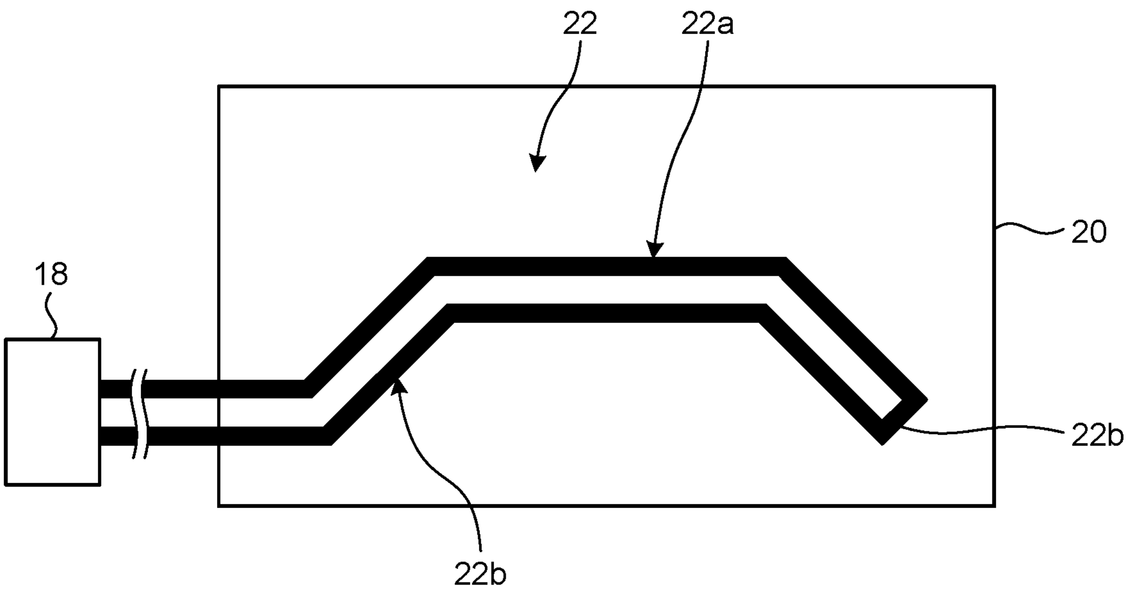
FIG. 3 is a schematic view of an exemplary shape of the magnetic field heating coil in FIG. 2.

In a case in which the magnetic field heating coil 22 illustrated in FIG. 2 is to have a shape of the parts being connected in a line, that is, a shape drawn with a single stroke, the magnetic field heating coil 22 has such a shape as illustrated in FIG. 3, for example. FIG. 3 is a schematic view of an exemplary shape of the magnetic field heating coil in FIG. 2. In the magnetic field heating coil 22 of FIG. 3, the first coil part 22*a* is made up of two parallel conductors provided along the width direction. Of the second coil parts 22*b*, the second coil part 22*b* on the other side (the right side of FIG. 3) in the width direction includes a conductor connected to the conductor on one side (the underside of FIG. 3) of the first coil part 22*a*, a conductor connected to the conductor on the other side (the upper side of FIG. 3) of the first coil part 22*a*, and a conductor connecting these conductors to one another. The second coil part 22*b* on one side (the left side of FIG. 3) in the width direction includes a conductor connected to the conductor on the one side (the underside of FIG. 3) of the first coil part 22*a* and a conductor connected to the conductor on the other side (the upper side of FIG. 3) of the first coil part 22*a*, and these conductors are connected to the control unit 18. The conductors of the second coil parts 22*b* are provided so as to tilt and extend to the heated area E side with respect to the conductors of the first coil part 22*a*.

In this manner, the magnetic field heating coil 22 is made to have the shape illustrated in FIG. 3, so that the conductors constituting the magnetic field heating coil 22, in the order from the control unit 18, go through the second coil part 22*b* on the one side and the first coil part 22*a*, lead to the second coil part 22*b* on the other side, turn around, go from the second coil part 22*b* on the other side, through the first coil part 22*a* and the second coil part 22*b* on the one side, and lead to the control unit 18. At this time, the first coil part 22*a* and the second coil parts 22*b* enable electric currents flowing through the two conductors, the conductor on one side and the conductor on the other side, to run in opposite directions.

Another example of the magnetic field heating coil 22 will be described next with reference to FIG. 4. FIG. 3 is a descriptive view illustrating an example of the heated area and the magnetic field heating coil of the heating device according to the first embodiment. The magnetic field heating coil 22 in FIG. 4 has the first coil part 22*a*, a pair of the second coil parts 22*b*, and a pair of third coil parts 22*c*. The first coil part 22*a* and the second coil parts 22*b* are the same as those in FIG. 2, and the description thereof is omitted.

The third coil parts 22*c* are each provided on either side of the first coil part 22*a* in the width direction so as to be continuous with the first coil part 22*a*. The third coil parts 22*c* are placed so as to be tilted a predetermined angle θ to the opposite side of the heated area E with respect to the line segment in the width direction. In other words, the second coil parts 22*b* and the third coil parts 22*c* are parts branching off from the first coil part 22*a*. Additionally, the third coil parts 22*c* are provided in such a manner that the third coil parts 22*c* and the second coil parts 22*b* are symmetric with respect to the line segment drawn in the width direction on the first coil part 22*a*. Consequently, the predetermined angle θ that the third coil parts 22*c* form is the same as the angle that the second coil parts 22*b* form. Assume that the length of the third coil parts 22*c* is l3. The length l3 of the third coil parts 22*c* is shorter than the length l1 of the first coil part 22*a* and the same as the length l2 of the second coil parts 22*b*.

The first coil part 22*a*, the second coil parts 22*b*, and the third coil parts 22*c* are symmetric with respect to the line segment drawn in the depth direction at the center of the first coil part 22*a* in the width direction.

Figure 4:
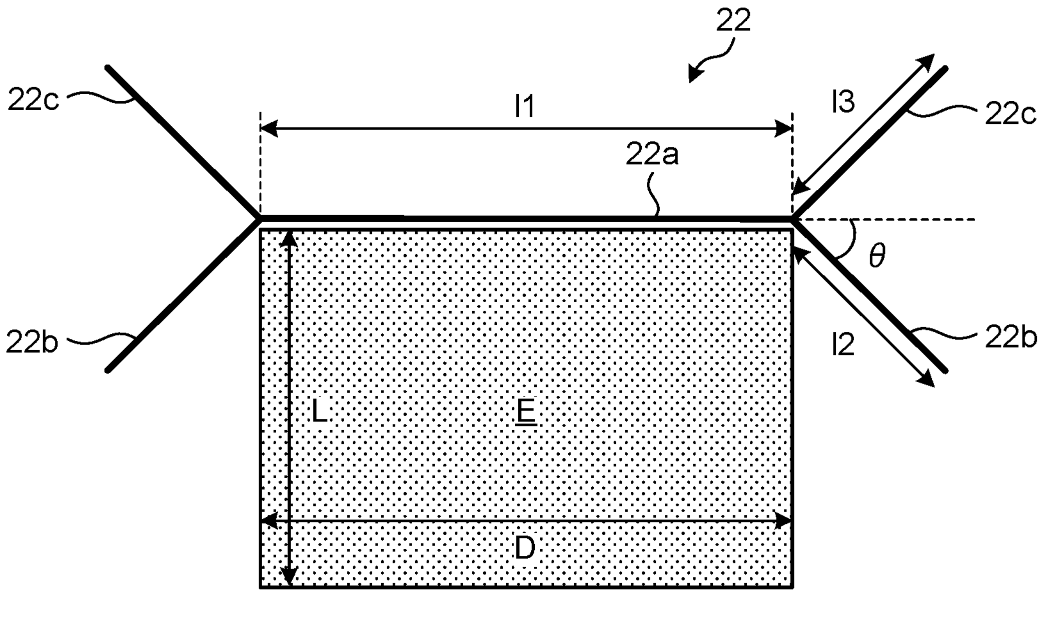
FIG. 4 is a descriptive view illustrating another example of the heated area and the magnetic field heating coil of the heating device according to the first embodiment.
Figure 5:
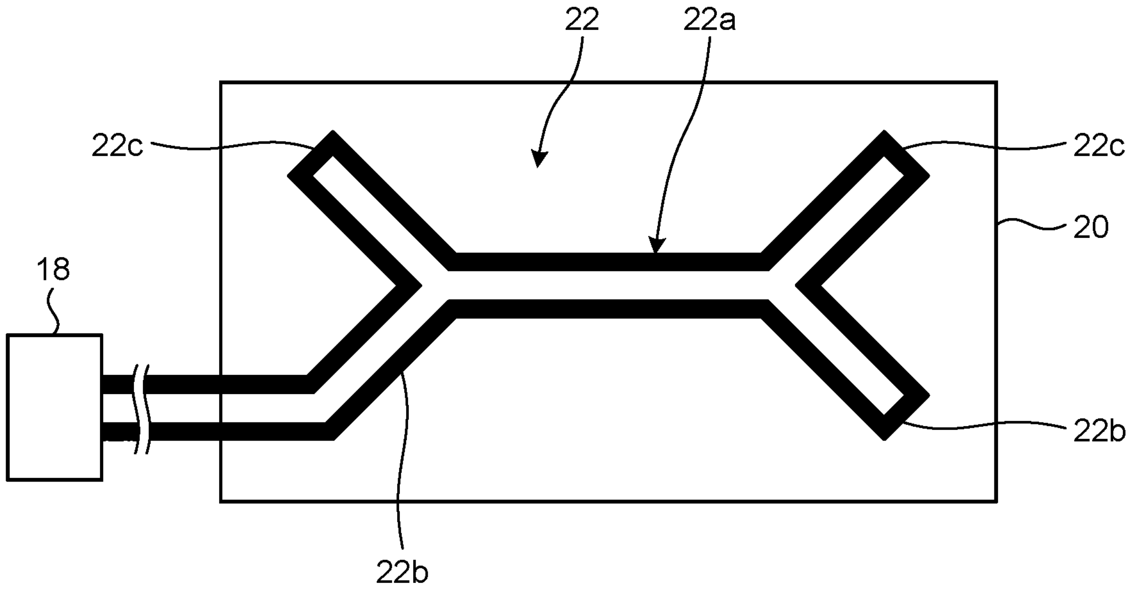
FIG. 5 is a schematic view of an exemplary shape of the magnetic field heating coil in FIG. 4.

In a case in which the magnetic field heating coil 22 illustrated in FIG. 4 is to have a shape of the parts being connected in a line, that is, a shape drawn with a single stroke, the magnetic field heating coil 22 has such a shape as illustrated in FIG. 5, for example. FIG. 5 is a schematic view of an exemplary shape of the magnetic field heating coil in FIG. 4. In the magnetic field heating coil 22 of FIG. 5, the first coil part 22*a* is made up of two parallel conductors provided along the width direction. Of the second coil parts 22*b*, the second coil part 22*b* on the other side (the right side of FIG. 5) in the width direction includes a conductor connected to the conductor on one side (the underside of FIG. 5) of the first coil part 22*a*, and the conductor of the second coil parts 22*b* is provided so as to extend from the conductor or the one side of the first coil part 22*a* to the heated area E side, as well as to extend back toward the conductor on the one side of the first coil part 22*a*. The second coil part 22*b* on one side (the left side of FIG. 5) in the width direction includes a conductor connected to the conductor on the one side (the underside of FIG. 5) of the first coil part 22*a* and a conductor connected to the conductor of the third coil part 22*c*, and these conductors are connected to the control unit 18. The conductors of the second coil parts 22*b* are provided so as to tilt and extend to the heated area E side with respect to the conductor of the first coil part 22*a*. The third coil parts 22*c* each include a conductor connected to the conductor on the other side (the upper side of FIG. 4) of the first oil part 22*a*, and the conductor of each third coil part 22*c* is provided so as to extend from the conductor on the other side of the first coil part 22*a* to the opposite side of the heated area E, as well as to extend back toward the conductor on the other side of the first coil part 22*a*. The end of each conductor of the second coil parts 22*b* is connected to the end of each conductor of the third coil parts 22*c*, the ends being on the opposite side of the ends connected to the first coil part 22*a*.

In this manner, the magnetic field heating coil 22 is made to have the shape illustrated in FIG. 5, so that the conductors constituting the magnetic field heating coil 22, in the order from the control unit 18, go through the second coil part 22*b* on the one side, the third coil part 22*c* on one side, the first coil part 22*a*, the third coil part 22*c* on the other side, the second coil part 22*b* on the other side, the first coil part 22*a*, and the second coil part 22*b* on the one side, and lead to the control unit 18. At this time, the first coil part 22*a*, the second coil parts 22*b*, and the third coil parts 22*c* enable electric currents flowing through the conductors, the conductor on one side and the conductor on the other side, to run in opposite directions. Although details will be described later, in a temperature distribution of the magnetic field heating coil 22 in FIG. 5, the uneven distribution of the temperature can be suppressed more than the conventional art, ensuring uniformity.

The control unit 18 controls a magnetic field provided to the laminated body by controlling an electric current fed through the magnetic field heating coil 22. The control unit 18 performs various control operations in the heating device 10 by performing arithmetic processing by an integrated circuit, such as a CPU.

When such a heating device 10 heats the laminated body placed on the mold 24, the control unit 18 feeds an electric current through the magnetic field heating coil 22, thereby generating a magnetic field from the magnetic field heating coil 22. The generated magnetic field passes through the mold 24 and is applied to the laminated body. Once the magnetic field is provided, the laminated body is cured by being inductively heated in the heated area E and is molded as the composite material 20.

As described above, according to the first embodiment, in the magnetic field heating coil 22 in FIG. 2, the magnetic field heating coil 22 has the first coil part 22*a* and the second coil parts 22*b*, which enables the composite material 20 around the magnetic field heating coil 22 to be uniformly heated.

Additionally, according to the first embodiment, in the magnetic field heating coil 22 in FIG. 4, the magnetic field heating coil 22 further has the third coil parts 22*c*, which enables the composite material 20 in a wider range around the magnetic field heating coil 22 to be uniformly heated.

Second Embodiment

Figure 6:
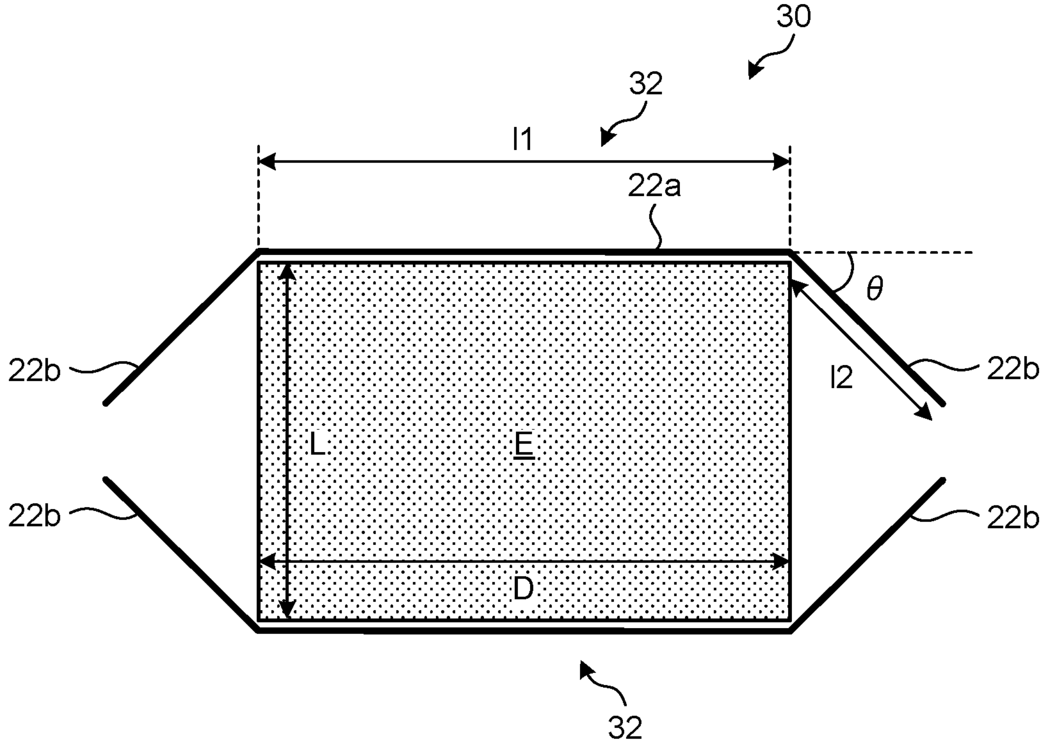
FIG. 6 is a descriptive view illustrating an example of a heated area of a heating device and a magnetic field heating coil according to a second embodiment.
Figure 7:
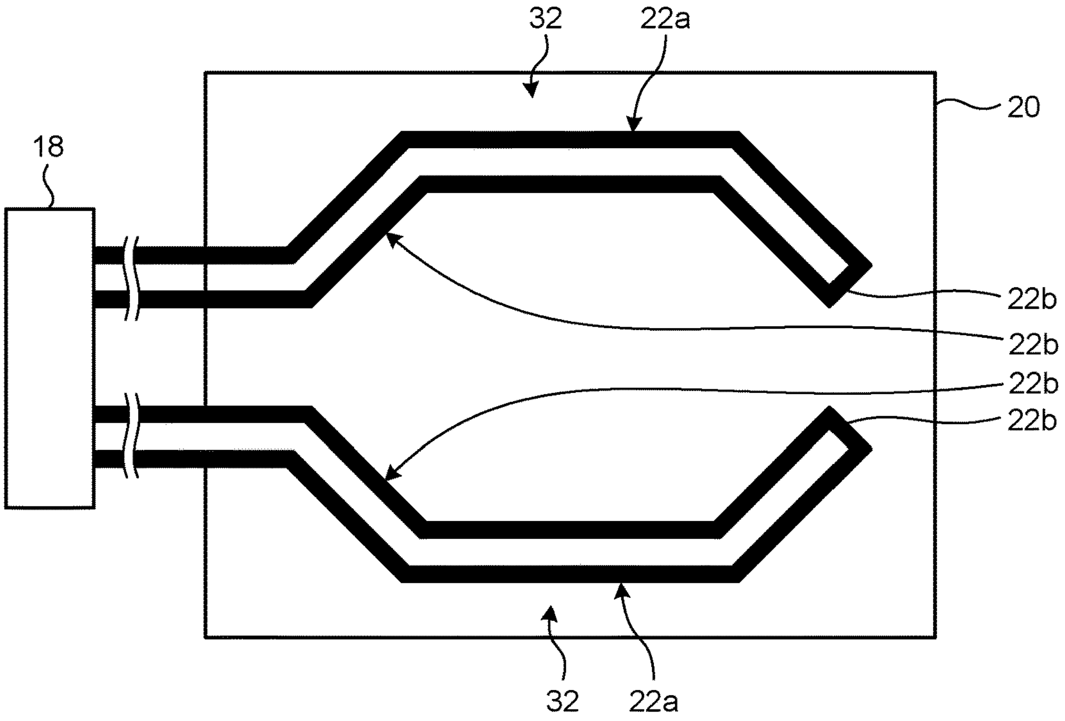
FIG. 7 is a schematic view of an exemplary shape of the magnetic field heating coil in FIG. 6.
Figure 8:
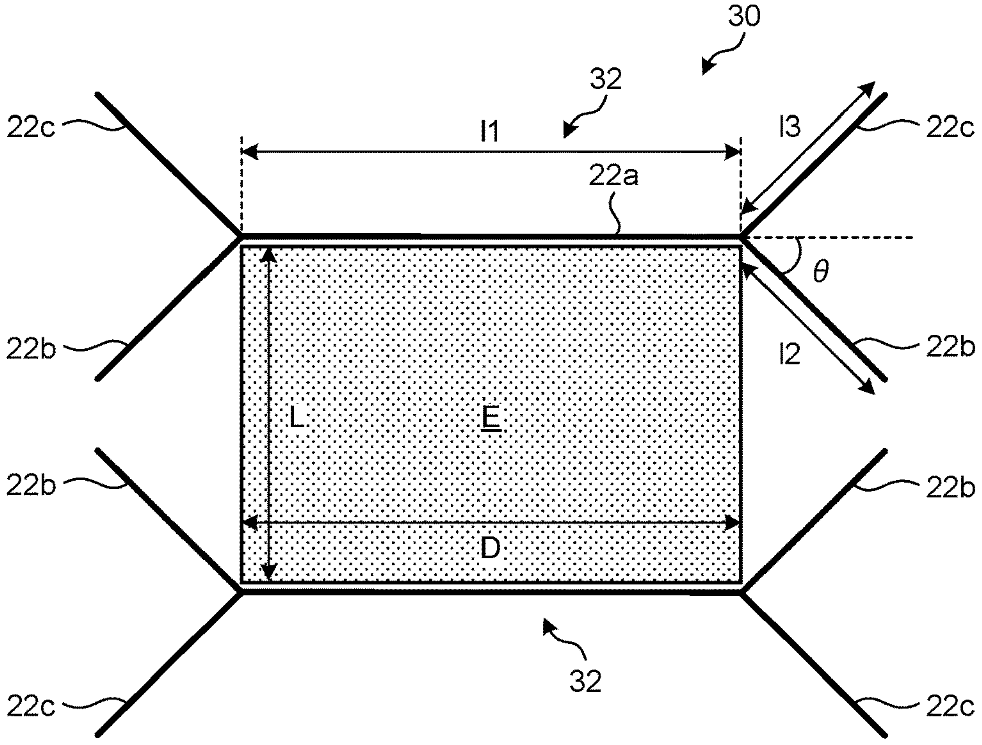
FIG. 8 is a descriptive view illustrating another example of the heated area and the magnetic field heating coil of the heating device according to the second embodiment.
Figure 9:
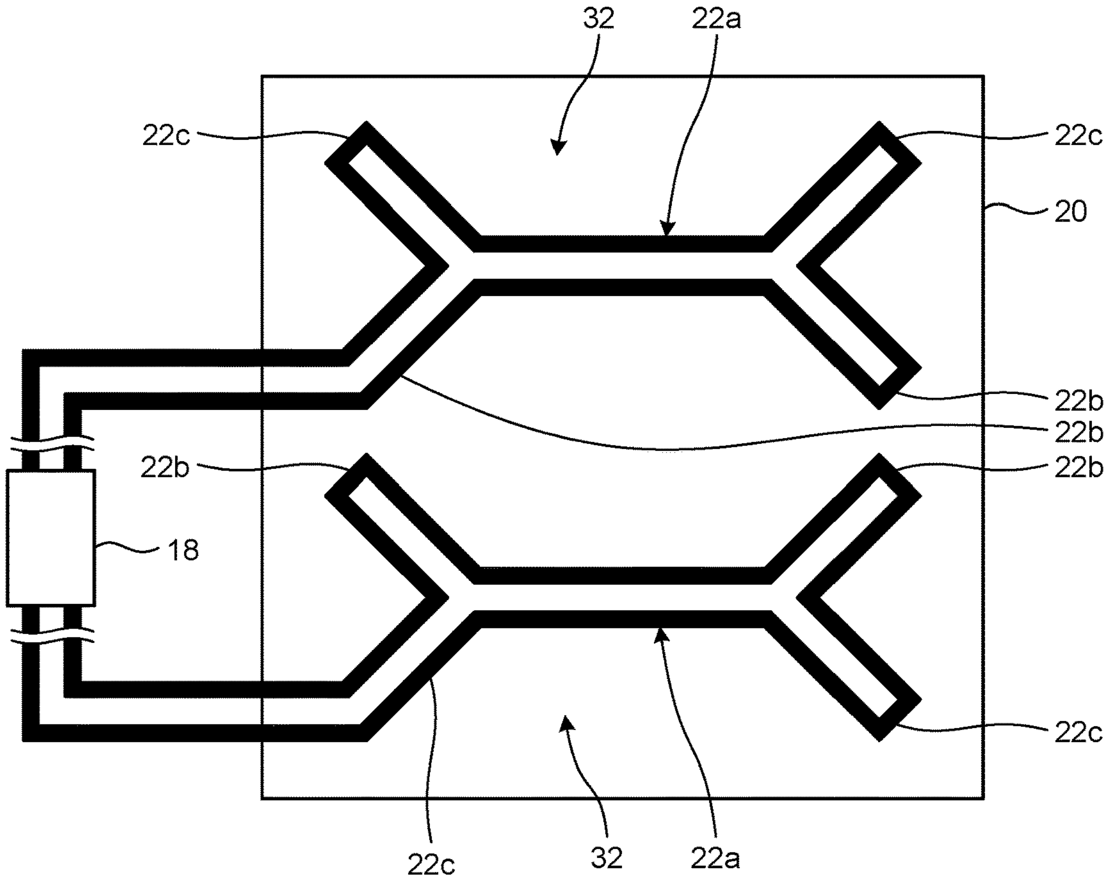
FIG. 9 is a schematic view of an exemplary shape of the magnetic field heating coil in FIG. 8.

A heating device 30 according to a second embodiment will be described next with reference to FIG. 6 to FIG. 9. In order to avoid overlapping descriptions, portions different from those of the first embodiment will be described, and portions having the same structures as those of the first embodiment will be described with the same reference signs given in the second embodiment. FIG. 6 is a descriptive view illustrating an example of a heated area and a magnetic field heating coil of the heating device according to the second embodiment. FIG. 7 is a schematic view of an exemplary shape of the magnetic field heating coil in FIG. 6. FIG. 8 is a descriptive view illustrating another example of the heated area and the magnetic field heating coil of the heating device according to the second embodiment. FIG. 9 is a schematic view of an exemplary shape of the magnetic field heating coil in FIG. 8.

In the heating device 30 of the second embodiment, a plurality of the magnetic field heating coils 22 in FIG. 2 and FIG. 4 of the first embodiment are placed by being lined up in the depth direction. Specifically, in the heating device 30 of the second embodiment, magnetic field heating coils 32 illustrated in FIG. 6 have the magnetic field heating coils 22 in FIG. 2 provided by being lined up in the depth direction with the heated area E sandwiched therebetween. As illustrated in FIG. 6, of the two magnetic field heating coils 32 lined up in the depth direction, the magnetic field heating coil 32 on one side (the upper side of FIG. 6) is placed on one side of the heated area E in the depth direction, and the magnetic field heating coil 32 on the other side (the underside of FIG. 6) is placed on the other side of the heated area E in the depth direction. The first coil part 22*a* of the magnetic field heating coil 32 on the one side and the first coil part 22*a* of the magnetic field heating coil 32 on the other side are provided so as to face one another in the depth direction. Also, the second coil parts 22*b* of the magnetic field heating coil 32 on the one side and the second coil parts 22*b* of the magnetic field heating coil 32 on the other side are provided so as to tilt to the heated area E side.

In a case in which the magnetic field heating coils 32 illustrated in FIG. 6 are each to be the magnetic field heating coil 22 having the shape drawn with a single stroke illustrated in FIG. 3, the magnetic field heating coils 32 have such a shape as illustrated in FIG. 7, for example. The magnetic field heating coils 32 in FIG. 7 have a structure in which the magnetic field heating coils 22 in FIG. 3 are provided on both sides in the depth direction with the heated area E sandwiched therebetween. The magnetic field heating coils 32 illustrated in FIG. 7 are the same as the magnetic field heating coil 22 illustrated in FIG. 3, and the description thereof is omitted. The magnetic field heating coils 32 illustrated in FIG. 7 are both connected to the control unit 18. In other words, conductors constituting the magnetic field heating coil 32 on one side and conductors constituting the magnetic field heating coil 32 on the other side are each connected to the control unit 18.

In the heating device 30 of the second embodiment, the magnetic field heating coils 32 illustrated in FIG. 8 have the magnetic field heating coils 22 in FIG. 4 provided by being lined up in the depth direction with the heated area E sandwiched therebetween. As illustrated in FIG. 8, of the two magnetic field heating coils 32 lined up in the depth direction, the magnetic field heating coil 32 on one side (the upper side of FIG. 8) is placed on one side of the heated area E in the depth direction, and the magnetic field heating coil 32 on the other side (the underside of FIG. 8) is placed on the other side of the heated area E in the depth direction. The first coil part 22*a* of the magnetic field heating coil 32 on the one side and the first coil part 22*a* of the magnetic field heating coil 32 on the other side are provided so as to face one another in the depth direction. Also, the second coil parts 22*b* of the magnetic field heating coil 32 on the one side and the second coil parts 22*b* of the magnetic field heating coil 32 on the other side are provided so as to tilt to the heated area E side. Furthermore, the third coil parts 22*c* of the magnetic field heating coil 32 on the one side and the third coil parts 22*c* of the magnetic field heating coil 32 on the other side are provided so as to tilt to the opposite side of the heated area E.

In a case in which the magnetic field heating coils 32 illustrated in FIG. 8 are each to be the magnetic field heating coil 22 having the shape drawn with a single stroke illustrated in FIG. 5, the magnetic field heating coils 32 have such a shape as illustrated in FIG. 9, for example. The magnetic field heating coils 32 in FIG. 9 have a structure in which the magnetic field heating coils 22 in FIG. 5 are provided on both sides in the depth direction with the heated area E sandwiched therebetween. The magnetic field heating coils 32 illustrated in FIG. 9 are the same as the magnetic field heating coil 22 illustrated in FIG. 5, and the description thereof is omitted. The magnetic field heating coils 32 illustrated in FIG. 9 are both connected to the control unit 18. In other words, conductors constituting the magnetic field heating coil 32 on one side and conductors constituting the magnetic field heating coil 32 on the other side are each connected to the control unit 18. Although details will be described later, in a temperature distribution of the magnetic field heating coil 32 in FIG. 9, the uneven distribution of the temperature can be suppressed more than the conventional art, ensuring uniformity.

As described above, according to the second embodiment, the magnetic field heating coils 32 can be placed on both sides of the heated area E in the depth direction, which can further improve uniform heating of the heated area E in the depth direction.

Third Embodiment

Figure 10:
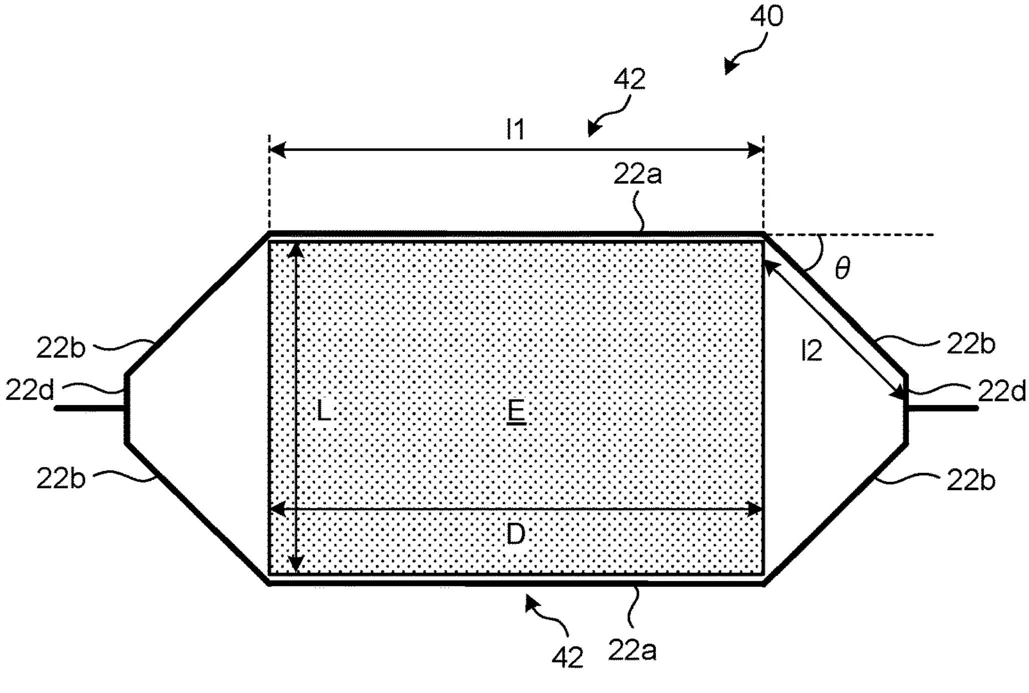
FIG. 10 is a descriptive view illustrating an example of a heated area of a heating device and a magnetic field heating coil according to a third embodiment.
Figure 11:
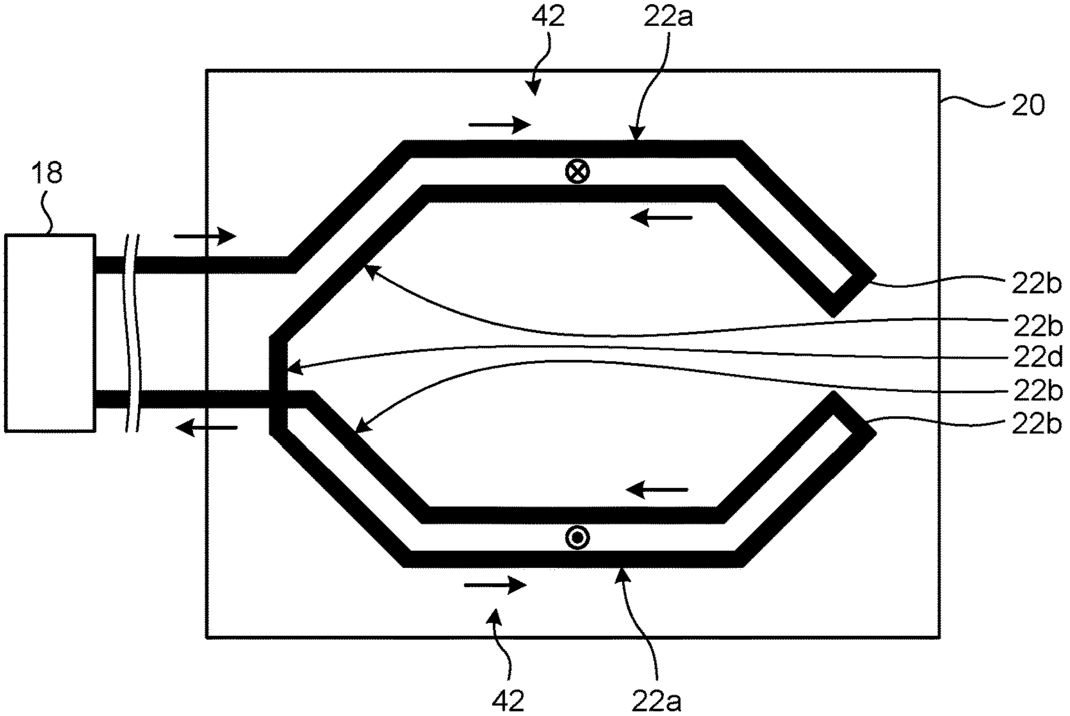
FIG. 11 is a schematic view of an exemplary shape of the magnetic field heating coil in FIG. 10.
Figure 12:
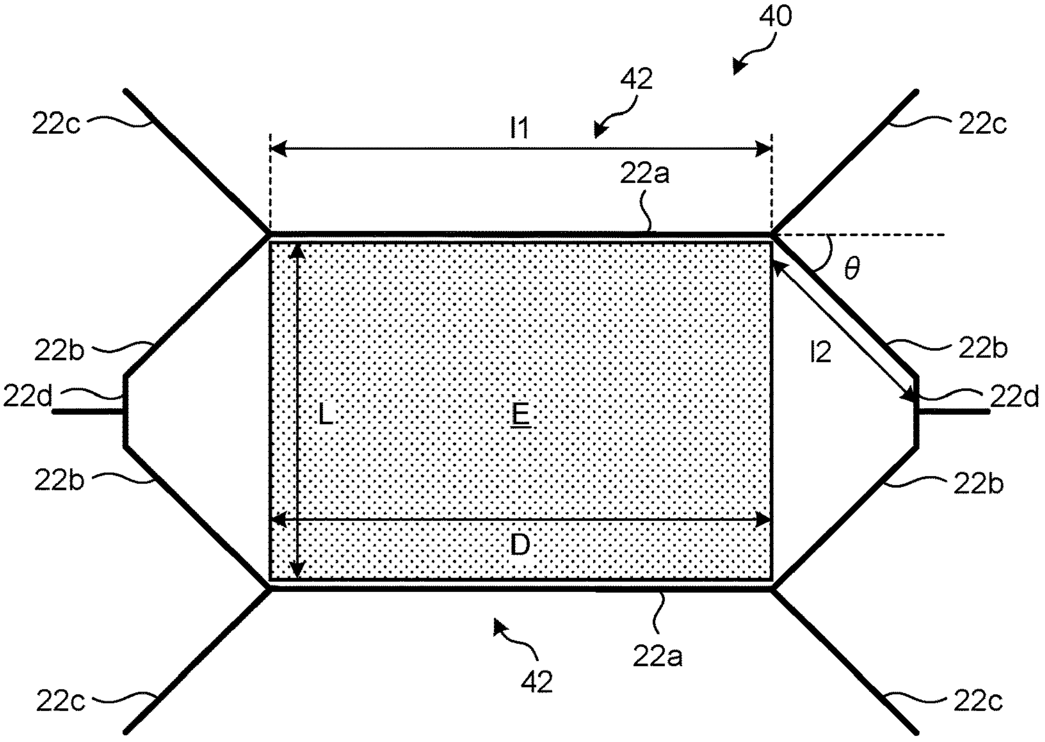
FIG. 12 is a descriptive view illustrating another example of the heated area and the magnetic field heating coil of the heating device according to the third embodiment.
Figure 13:
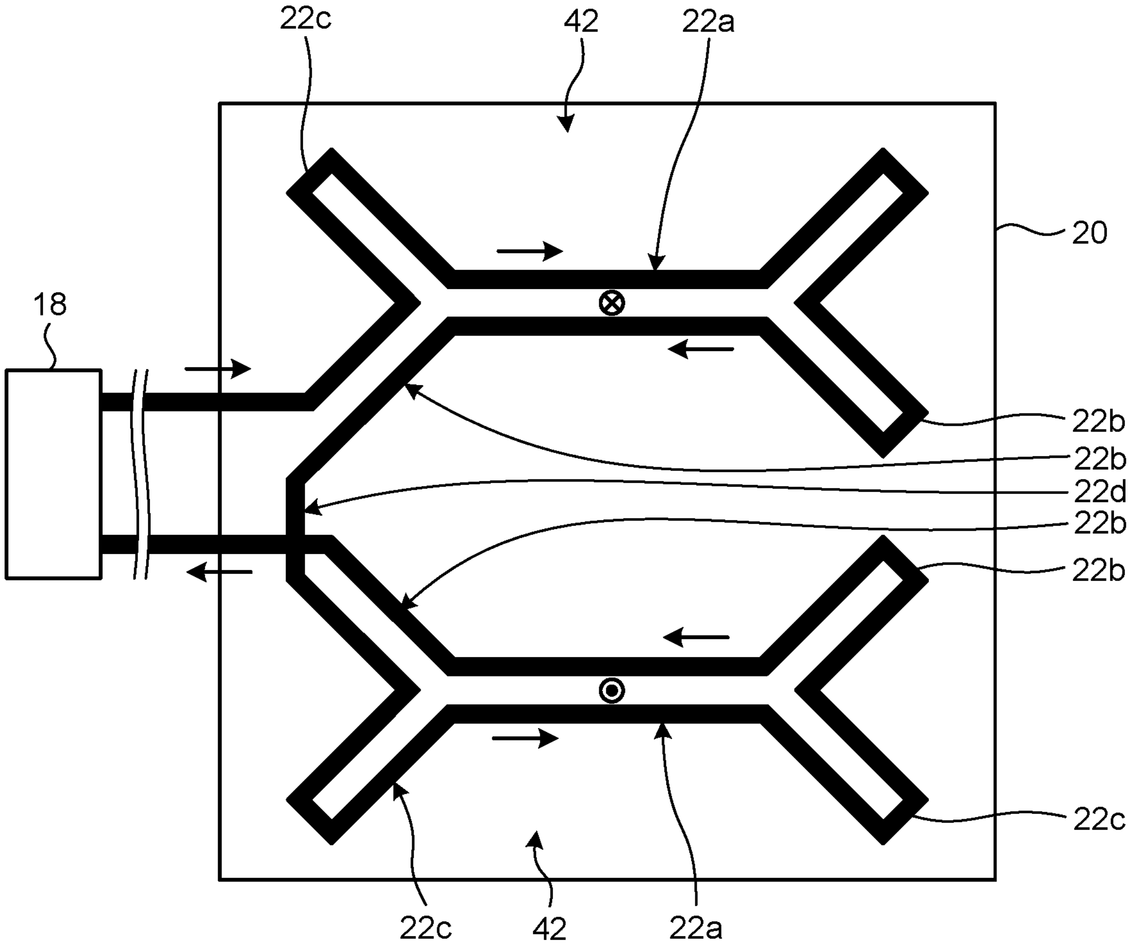
FIG. 13 is a schematic view of an exemplary shape of the magnetic field heating coil in FIG. 12.
Figure 14:
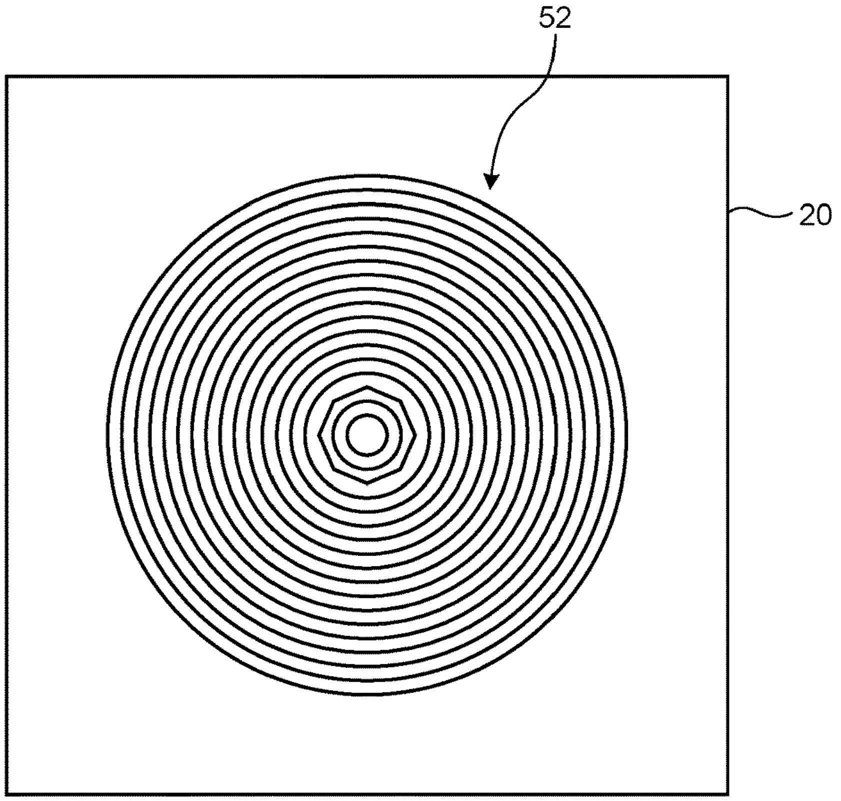
FIG. 14 is a schematic view of a magnetic field heating coil of a heating device according to a conventional art.

A heating device 40 according to a third embodiment will be described next with reference to FIG. 10 to FIG. 13. In order to avoid overlapping descriptions, portions different from those of the first and the second embodiments will be described, and portions having the same structures as those of the first and the second embodiments will be described with the same reference signs given also in the third embodiment. FIG. 10 is a descriptive view illustrating an example of a heated area and a magnetic field heating coil of the heating device according to the third embodiment. FIG. 11 is a schematic view of an exemplary shape of the magnetic field heating coil in FIG. 10. FIG. 12 is a descriptive view illustrating another example of the heated area and the magnetic field heating coil of the heating device according to the third embodiment. FIG. 13 is a schematic view of an exemplary shape of the magnetic field heating coil in FIG. 12.

In the heating device 40 of the third embodiment, a plurality of the magnetic field heating coils 32 in FIG. 6 and FIG. 8 of the second embodiment are connected to have a shape of the parts being connected in a line, that is, a shape drawn with a single stroke. Specifically, in the heating device 40 of the third embodiment, magnetic field heating coils 42 illustrated in FIG. 10 have the magnetic field heating coils 32 in FIG. 6 provided by being lined up in the depth direction with the heated area E sandwiched therebetween and connected by connecting parts 22*d*. In FIG. 10, a pair of the connecting parts 22*d* are provided, and the connecting parts 22*d* connect the second coil parts 22*b* of the magnetic field heating coil 42 on one side (the underside of FIG. 10) to the second coil parts 22*b* of the magnetic field heating coil 42 on the other side (the upper side of FIG. 10), respectively. Although a pair of the connecting parts 22*d* are provided in FIG. 10, the number is not particularly limited, and the part may have any structure as long as the part connect the magnetic field heating coils 42.

In other words, as illustrated in FIG. 10, of the magnetic field heating coils 42, the magnetic field heating coil 42 provided on the one side (the underside of FIG. 10) of the heated area E in the depth direction has the first coil part 22*a* and a pair of the second coil parts 22*b*. The magnetic field heating coil 42 provided on the other side (the upper side of FIG. 10) of the heated area E in the depth direction has the first coil part 22*a* and a pair of the second coil parts 22*b*. The first coil part 22*a* of the magnetic field heating coil 42 on the one side and the first coil part 22*a* of the magnetic field heating coil 42 on the other side are provided so as to face one another in the depth direction. Also, the second coil parts 22*b* of the magnetic field heating coil 42 on the one side and the second coil parts 22*b* of the magnetic field heating coil 42 on the other side are provided so as to tilt to the heated area E side. The connecting parts 22*d* both connect the second coil parts 22*b* on the one side and the second coil parts 22*b* on the other side.

In a case in which the magnetic field heating coils 42 illustrated in FIG. 10 are to be the magnetic field heating coils 42 having the shape drawn with a single stroke, the magnetic field heating coils 42 have such a shape as illustrated in FIG. 11, for example. For the portions of the magnetic field heating coils 42 illustrated in FIG. 11 that are the same as those of the magnetic field heating coils 32 illustrated in FIG. 7, the description thereof is omitted, and only different portions will be described. In FIG. 11, one connecting part 22*d* connects the second coil part 22*b* on one side (the left side of FIG. 11) of the magnetic field heating coil 42 on the one side to the second coil part 22*b* on one side (the left side of FIG. 11) of the magnetic field heating coil 42 on the other side.

In the magnetic field heating coil 42 on the one side (the underside of FIG. 11) illustrated in FIG. 11, the second coil part 22*b* on the one side (the left side of FIG. 11) includes a conductor connected to the conductor of the first coil part 22*a* on the one side (the underside of FIG. 11) and a conductor connected to the conductor of the first coil part 22*a* on the other side (the upper side of FIG. 11). The conductor of the second coil part 22*b* connected to the conductor of the first coil part 22*a* on the side is connected to the conductor of the connecting part 22*d*. Meanwhile, the conductor of the second coil part 22*b* connected to the conductor of the first coil part 22*a* on the other side is connected to the control unit 18.

In the magnetic field heating coil 42 on the other side (the upper side of FIG. 11) illustrated in FIG. 11, the second coil part 22*b* on the one side (the left side of FIG. 11) includes a conductor connected to the conductor of the first coil part 22*a* on the one side (the underside of FIG. 11) and a conductor connected to the conductor of the first coil part 22*a* on the other side (the upper side of FIG. 11). The conductor of the second coil part 22*b* connected to the conductor of the first coil part 22*a* on the one side is connected to the conductor of the connecting part 22*d*. Meanwhile, the conductor of the second coil part 22*b* connected to the conductor of the first coil part 22*a* on the other side is connected to the control unit 18.

In this manner, the magnetic field heating coils 42 are made to have the shape illustrated in FIG. 11, so that the conductors constituting the magnetic field heating coils 42, in the order from the control unit 18, go through the magnetic field heating coil 42 on the other side, the connecting part 22*d*, and the magnetic field heating coil 42 on the other side, and lead to the control unit 18. The conductors of the magnetic field heating coil 42 on the other side, in the order from the control unit 18, go through the second coil part 22*b* on the one side and the first coil part 22*a*, lead to the second coil part 22*b* on the other side, turn around, go from the second coil part 22*b* on the other side, through the first coil part 22*a* and the second coil part 22*b* on the one side, and lead to the connecting part 22*d*. The conductors of the magnetic field heating coil 42 on the one side, in the order from the connecting part 22*d*, go through the second coil part 22*b* on the one side and the first coil part 22*a*, lead to the second coil part 22*b* on the other side, turn around, go from the second coil part 22*b* on the other side, through the first coil part 22*a* and the second coil part 22*b* on the one side, and lead to the control unit 18.

At this time, the first coil part 22*a* of the magnetic field heating coil 42 on the other side enables electric currents flowing through the two conductors, the conductor on one side and the conductor on the other side, to run in opposite directions. Consequently, in the first coil part 22*a* of the magnetic field heating coil 42 on the other side, a magnetic field of the other polarity can be formed between the two conductors. The first coil part 22*a* of the magnetic field heating coil 42 on the one side enables electric currents flowing through the two conductors, the conductor on one side and the conductor on the other side, to run in opposite directions.

Consequently, in the first coil part 22*a* of the magnetic field heating coil 42 on the one side, a magnetic field of one polarity can be formed between the two conductors. In other words, the connecting part 22*d* establishes a connection so that the electric current flowing through the magnetic field heating coil 42 on the other side and the electric current flowing through the magnetic field heating coil 42 on the one side are of opposite phase, which makes the magnetic field formed in the magnetic field heating coil 42 on the other side and the magnetic field formed in the magnetic field heating coil 42 on the one side are of opposite polarity.

In the heating device 40 of the third embodiment, the magnetic field heating coils 42 illustrated in FIG. 12 have the magnetic field heating coils 32 in FIG. 8 provided by being lined up in the depth direction with the heated area E sandwiched therebetween and connected by connecting parts 22*d*. In FIG. 12, a pair of the connecting parts 22*d* are provided, and the connecting parts 22*d* connect the second coil parts 22*b* of the magnetic field heating coil 42 on one side (the underside of FIG. 12) to the second coil parts 22*b* of the magnetic field heating coil 42 on the other side (the upper side of FIG. 12), respectively. Although a pair of the connecting parts 22*d* are provided in FIG. 12, the number is not particularly limited, and the part may have any structure as long as the part connect the magnetic field heating coils 42.

In other words, as illustrated in FIG. 12, of the magnetic field heating coils 42, the magnetic field heating coil 42 provided on the one side (the upper side of FIG. 12) of the heated area E in the depth direction has the first coil part 22*a*, a pair of the second coil parts 22*b*, and a pair of the third coil parts 22*c*. The magnetic field heating coil 42 provided on the other side (the upper side of FIG. 12) of the heated area E in the depth direction also has the first coil part 22*a*, a pair of the second coil parts 22*b*, and a pair of the third coil parts 22*c*. The first coil part 22*a* of the magnetic field heating coil 42 on the one side and the first coil part 22*a* of the magnetic field heating coil 42 on the other side are provided so as to face one another in the depth direction. The second coil parts 22*b* of the magnetic field heating coil 42 on the one side and the second coil parts 22*b* of the magnetic field heating coil 42 on the other side are provided so as to tilt to the heated area E side. The third coil parts 22*c* of the magnetic field heating coil 42 on the one side and the third coil parts 22*c* of the magnetic field heating coil 42 on the other side are provided so as to tilt to the opposite side of the heated area E. The connecting parts 22*d* both connect the second coil parts 22*b* on the one side and the second coil parts 22*b* on the other side.

In a case in which the magnetic field heating coils 42 illustrated in FIG. 12 are to be the magnetic field heating coils 42 having the shape drawn with a single stroke, the magnetic field heating coils 42 have such a shape as illustrated in FIG. 13, for example. For the portions of the magnetic field heating coils 42 illustrated in FIG. 13 that are the same as those of the magnetic field heating coils 32 illustrated in FIG. 9, the description thereof is omitted, and only different portions will be described. In FIG. 13, one connecting part 22*d* connects the second coil part 22*b* on one side (the left side of FIG. 13) of the magnetic field heating coil 42 on the one side to the second coil part 22*b* on the one side (the left side of FIG. 13) of the magnetic field heating coil 42 on the other side.

In the magnetic field heating coil 42 on the one side (the underside of FIG. 13) illustrated in FIG. 13, the second coil part 22*b* on the one side (the left side of FIG. 13) includes a conductor connected to the conductor of the first coil part 22*a* on the one side (the underside of FIG. 13) and a conductor connected to the conductor of the first coil part 22*a* on the other side (the upper side of FIG. 13). The conductor of the second coil part 22*b* connected to the conductor of the first coil part 22*a* on the one side is connected to the conductor of the connecting part 22*d*. Meanwhile, the conductor of the second coil part 22*b* connected to the conductor of the first coil part 22*a* on the other side is connected to the control unit 18.

In the magnetic field heating coil 42 on the other side (the upper side of FIG. 13) illustrated in FIG. 13, the second coil part 22*b* on the one side (the left side of FIG. 13) includes a conductor connected to the conductor of the first coil part 22*a* on the one side (the underside of FIG. 13) and a conductor connected to the conductor of the first coil part 22*a* on the other side (the upper side of FIG. 13). The conductor of the second coil part 22*b* connected to the conductor of the first coil part 22*a* on the one side is connected to the conductor of the connecting part 22*d*. Meanwhile, the conductor of the second coil part 22*b* connected to the conductor of the first coil part 22*a* on the other side is connected to the control unit 18.

In this manner, the magnetic field heating coils 42 are made to have the shape illustrated in FIG. 13, so that the conductors constituting the magnetic field heating coils 42, in the order from the control unit 18, go through the magnetic field heating coil 42 on the other side, the connecting part 22*d*, and the magnetic field heating coil 42 on the other side, and lead to the control unit 18. The conductors of the magnetic field heating coil 42 on the other side, in the order from the control unit 18, go through the second coil part 22*b* on the one side, the third coil part 22*c* on the one side, the first coil part 22*a*, the third coil part 22*c* on the other side, the second coil part 22*b* on the other side, the first coil part 22*a*, and the second coil parts 22*b* on the one side, and lead to the connecting part 22*d*. The conductors of the magnetic field heating coil 42 on the one side, in the order from the connecting part 22*d*, go through the second coil part 22*b* on the one side, the third coil part 22*c* on the one side, the first coil part 22*a*, the third coil part 22*c* on the other side, the second coil part 22*b* on the other side, the first coil part 22*a*, and the second coil part 22*b* on the one side, and lead to the control unit 18.

At this time, the first coil part 22*a* of the magnetic field heating coil 42 on the other side enables electric currents flowing through the two conductors, the conductor on one side and the conductor on the other side, to run in opposite directions. Consequently, in the first coil part 22*a* of the magnetic field heating coil 42 on the other side, a magnetic field of the other polarity can be formed between the two conductors. The first coil part 22*a* of the magnetic field heating coil 42 on the one side enables electric currents flowing through the two conductors, the conductor on one side and the conductor on the other side, to run in opposite directions.

Consequently, in the first coil part 22*a* of the magnetic field heating coil 42 on the one side, a magnetic field of one polarity can be formed between the two conductors. In other words, the connecting part 22*d* establishes a connection so that the electric current flowing through the magnetic field heating coil 42 on the other side and the electric current flowing through the magnetic field heating coil 42 on the one side are of opposite phase, which makes the magnetic field formed in the magnetic field heating coil 42 on the other side and the magnetic field formed in the magnetic field heating coil 42 on the one side are of opposite polarity.

As described above, according to the third embodiment, the magnetic field heating coils 42 can be placed so as to surround the heated area E, which can further improve uniform heating of the heated area E. The magnetic field heating coils 42 can have a shape of the parts being connected in a line, that is, a shape drawn with a single stroke. Thus, the magnetic field heating coils 42 can have a shape easily formed with a single conductor.

According to the third embodiment, because the magnetic field formed in the magnetic field heating coil 42 on the one side and the magnetic field formed in the magnetic field heating coil 42 on the other side are of opposite polarity, the magnetic fields can be prevented from being canceled out, which enables the composite material 20 to be heated preferably by the magnetic field heating coils 42.

Although the third embodiment has a structure in which the single connecting part 22*d* connects the magnetic field heating coils 42 in FIG. 11 and FIG. 13, the embodiment is not particularly limited to this connection. The way of connecting the magnetic field heating coils 42 by the connecting parts 22*d* may be any connection as long as the magnetic field formed in the magnetic field heating coil 42 on the one side and the magnetic field formed in the magnetic field heating coil 42 on the other side are of opposite polarity.

Next, temperature distributions will be compared between a conventional magnetic field heating coil and the magnetic field heating coil 22 of the first embodiment as well as the magnetic field heating coil 32 of the second embodiment with reference to FIG. 14 to FIG. 17. FIG. 10 is a schematic view of a magnetic field heating coil of a heating device according to conventional art. A conventional magnetic field heating coil 52 illustrated in FIG. 10 is arranged so that conductors are placed concentrically.

Figure 15:
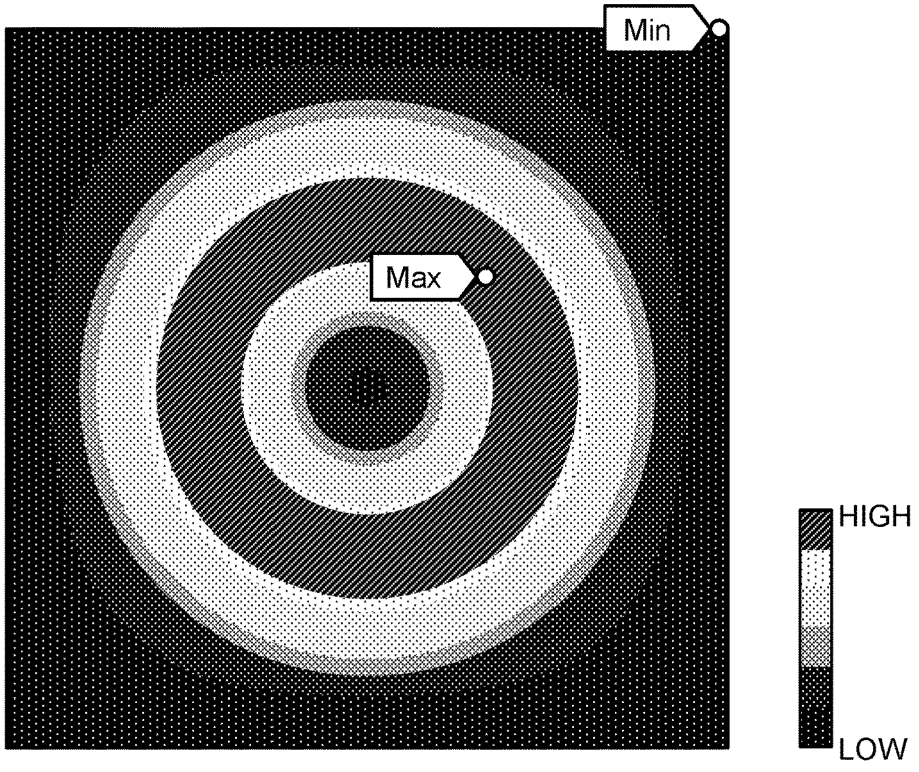
FIG. 15 is a descriptive view illustrating a temperature distribution of a heated area heated by the magnetic field heating coil according to the conventional art.

FIG. 15 is a descriptive view illustrating a temperature distribution of a heated area heated by the magnetic field heating coil according to the conventional art. As illustrated in FIG. 15, in the temperature distribution of the heated area E heated by the conventional magnetic field heating coil 52, the central region between the center and the radial outside is a heated region having a maximum temperature in the radial direction of the magnetic field heating coil 52. The heated region having a maximum temperature is an annular region along the circumferential direction.

Figure 16:
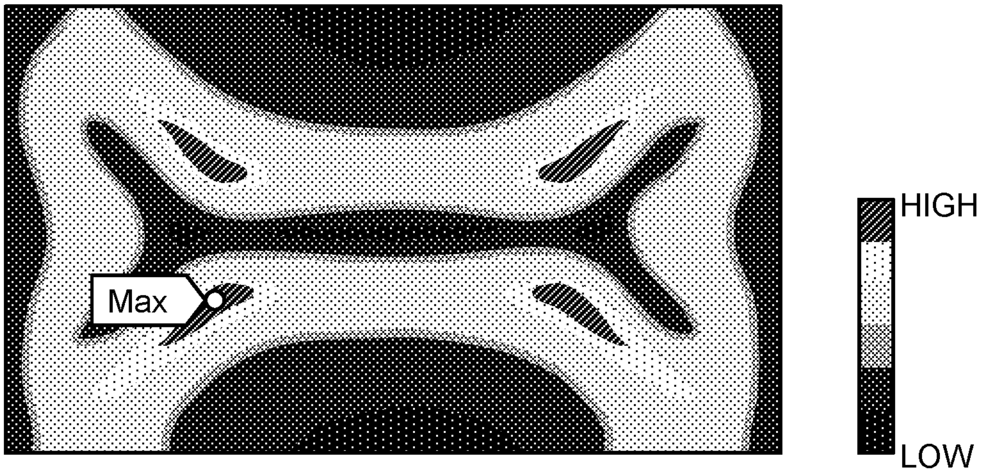
FIG. 16 is a descriptive view illustrating a temperature distribution of the heated area heated by the magnetic field heating coil according to the first embodiment.

FIG. 16 is a descriptive view illustrating a temperature distribution of the heated area heated by the magnetic field heating coil according to the first embodiment. As illustrated in FIG. 16, in the temperature distribution of the heated area E heated by the magnetic field heating coil 22 illustrated in FIG. 4 of the first embodiment, heated regions having a maximum temperature are dispersedly formed in four places: two heated regions are formed for each side of the first coil part 22*a* in the width direction, and the heated regions are formed on both sides across the first coil part 22*a* in the depth direction. When the heated regions in FIG. 12 is compared with the heated region in FIG. 11, the uneven distribution of the heated regions having a maximum temperature is reduced in the temperature distribution in FIG. 12.

Figure 17:
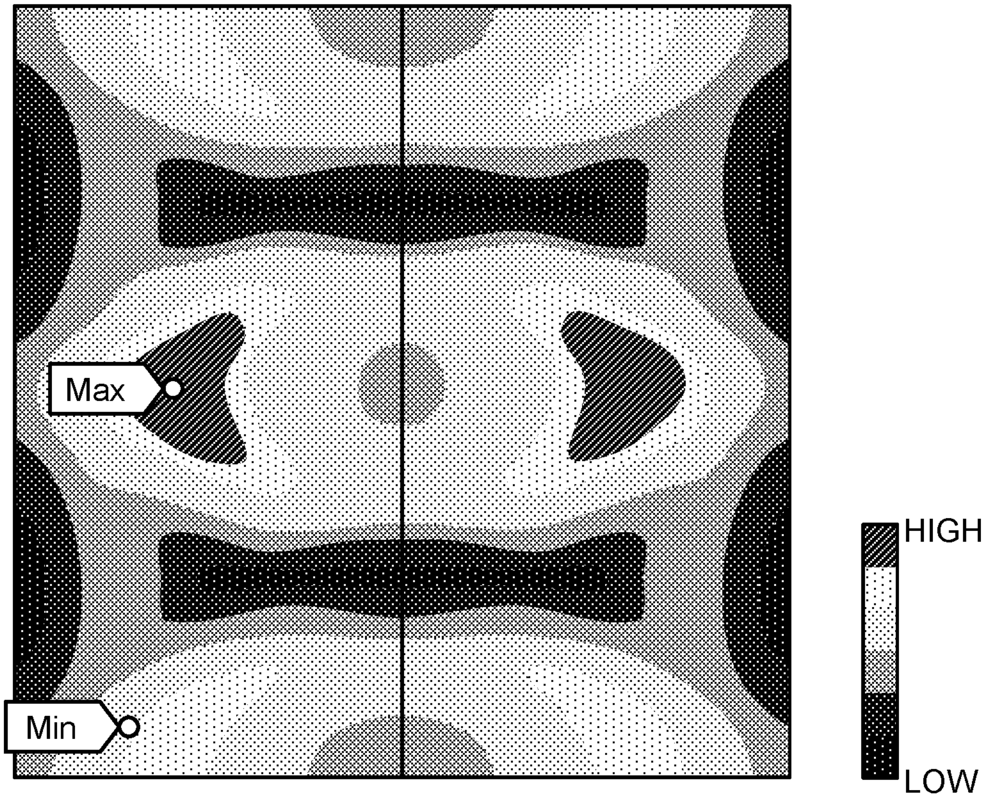
FIG. 17 is a descriptive view illustrating a temperature distribution of the heated area heated by the magnetic field heating coil according to the second embodiment.

FIG. 17 is a descriptive view illustrating a temperature distribution of the heated area heated by the magnetic field heating coil according to the second embodiment. As illustrated in FIG. 17, in the temperature distribution of the heated area E heated by the magnetic field heating coil 32 illustrated in FIG. 7 of the second embodiment, heated regions having a maximum temperature are dispersedly formed in two places: the two heated regions are formed on both sides of the first coil part 22*a* in the width direction. The two heated regions having a maximum temperature are formed in the heated area E between the two magnetic field heating coils 32. When the heated regions in FIG. 17 are compared with the heated regions in FIG. 15, the uneven distribution of the heated regions having a maximum temperature is reduced in the temperature distribution FIG. 17, and uniformity is ensured compared with the temperature distribution FIG. 12.

REFERENCE SIGNS LIST

10 Heating device (the first embodiment)
18 Control unit
20 Composite material
22 Magnetic field heating coil (the first embodiment)
22*a* First coil part
22*b* Second coil part
22*c* Third coil part
22*d* Connecting part
24 Mold
30 Heating device (the second embodiment)
32 Magnetic field heating coil (the second embodiment)
40 Heating device (the third embodiment)
42 Magnetic field heating coil (the third embodiment)
52 Magnetic field heating coil

The invention claimed is:

1. A heating device comprising:

a magnetic field heating coil that inductively heats a composite material by a magnetic field, wherein the composite material has a length in a depth direction and a length in a width direction orthogonal to the depth direction, the magnetic field heating coil has:

a first coil part provided along the width direction, a pair of second coil parts provided on opposite sides of the first coil part in the width direction, respectively, so as to be continuous with the first coil part, the second coil parts being tilted at a predetermined angle so as to extend toward a first side in the depth direction with respect to the width direction, and a pair of third coil parts arranged such that the third coil parts and the second coil parts are respectively symmetric relative to a line segment drawn in the width direction on the first coil part, the first coil part and the second coil parts are symmetric with respect to a line segment drawn in the depth direction and at a center of the first coil part in the width direction, the first coil part includes two conductors provided in parallel along the width direction, each second coil part includes two conductors that extend in a direction that is tilted at the predetermined angle toward the first side in the depth direction with respect to the width direction, each third coil part includes two conductors that extend in a direction that is tilted at a predetermined angle toward a second side in the depth direction with respect to the width direction, the first and second sides being opposite sides in the depth direction with respect to the width direction, and wherein the first coil part, the pair of second coil parts and the pair of third coil parts are arranged such that, for the two conductors of each of (i) the first coil part, (ii) each second coil part of the pair of second coil parts, and (iii) each third coil part of the pair of third coil parts, a current flowing through the magnetic field heating coil flows through one of the two conductors in a direction which is opposite to a direction in which the current flows through the other of the two conductors.

2. The heating device according to claim 1, wherein a heating target of the magnetic field heating coil is a preset heated area of the composite material, the heated area has a length L in the depth direction, and a length D in the width direction orthogonal to the depth direction, in the magnetic field heating coil, the second coil parts are tilted at the predetermined angle toward a heated area side that is on the first side in the depth direction with respect to the width direction, the predetermined angle satisfies $0° < \theta \leq 90°$, where θ is the predetermined angle, the first coil part has a length l1 in the width direction, and the length l1 of the first coil part is greater than the length D of the heated area: l1>D.

3. The heating device according to claim 2, wherein the magnetic field heating coil is each of a plurality of magnetic field heating coils provided by being lined up in the depth direction.

4. The heating device according to claim 3, further comprising a connecting part that connects, to each other, the plurality of magnetic field heating coils provided by being lined up in the depth direction.

5. The heating device according to claim 4, wherein the connecting part establishes a connection so that an electric current flowing through one of the magnetic field heating coils adjacent to the depth direction and an electric current flowing through the other magnetic field heating coil adjacent to the depth direction are of opposite phase.

* * * * *